(12) United States Patent
Yuan

(10) Patent No.: US 8,429,249 B2
(45) Date of Patent: Apr. 23, 2013

(54) SYSTEM AND METHOD FOR CONFIGURING SERVLET-BASED COMPONENTS AS DYNAMIC CONTENT COMPONENTS

(75) Inventor: Sheue Yuan, Moorestown, NJ (US)

(73) Assignee: CA, Inc., Islandia, NY (US)

( * ) Notice: Subject to any disclaimer, the term of this patent is extended or adjusted under 35 U.S.C. 154(b) by 1218 days.

(21) Appl. No.: 10/819,013

(22) Filed: Apr. 6, 2004

(65) Prior Publication Data

US 2005/0021694 A1 Jan. 27, 2005

Related U.S. Application Data

(60) Provisional application No. 60/486,588, filed on Jul. 11, 2003.

(51) Int. Cl.
*G06F 15/16* (2006.01)

(52) U.S. Cl.
USPC .................................... 709/219; 709/217

(58) Field of Classification Search .................. None
See application file for complete search history.

(56) References Cited

U.S. PATENT DOCUMENTS

| | | | |
|---|---|---|---|
| 6,336,135 B1 * | 1/2002 | Niblett et al. | 709/215 |
| 6,412,073 B1 | 6/2002 | Rangan | |
| 6,594,766 B2 * | 7/2003 | Rangan et al. | 726/8 |
| 6,865,593 B1 * | 3/2005 | Reshef et al. | 709/203 |
| 7,277,924 B1 * | 10/2007 | Wichmann et al. | 709/217 |
| 7,412,374 B1 * | 8/2008 | Seiler et al. | 704/8 |
| 2001/0009016 A1 * | 7/2001 | Hofmann et al. | 709/219 |
| 2001/0034771 A1 * | 10/2001 | Hutsch et al. | 709/217 |
| 2001/0047402 A1 * | 11/2001 | Saimi et al. | 709/219 |
| 2002/0099936 A1 * | 7/2002 | Kou et al. | 713/151 |
| 2002/0169852 A1 * | 11/2002 | Schaeck | 709/218 |
| 2003/0046438 A1 * | 3/2003 | O'Donnell | 709/250 |
| 2004/0030795 A1 * | 2/2004 | Hesmer et al. | 709/231 |
| 2004/0054749 A1 * | 3/2004 | Doyle et al. | 709/217 |

OTHER PUBLICATIONS

Balsoy, Ozgur, et al., "The Online Knowledge Center: Building a Component Based Portal," *Proceedings of the International Conference on Information and Knowledge Engineering*, XP-002284054, Jun. 2002, 6 pages.

Diaz, Angel Luis, et al., "*Specification: Web Services for Remote Portals (WSRP),*" XP002274610, Jan. 21, 2002, 26 pages <http:www-106.ibm.com/developerworks/webservices/library/ws-wsrp/>, visited Mar. 23, 2004.

Wege, Christian, "Portal Server Technology," *IEEE Internet Computing*, XP-001130972, May-Jun. 2002, pp. 73-77.

(Continued)

*Primary Examiner* — Krista Zele
*Assistant Examiner* — Matthew Lindsey
(74) *Attorney, Agent, or Firm* — Pillsbury Winthrop Shaw Pittman LLP

(57) ABSTRACT

In certain embodiments, a system for configuring a servlet-based component as a dynamic content component includes a first server system comprising a dynamic component operable to gather configuration information in response to a request to access a servlet-based component associated with a second server system. The system further includes a connection servlet invoked by the dynamic component and operable to establish a connection with the servlet-based component associated with the second server system based at least in part on the gathered configuration information, and to handle communication with the servlet-based component on the second server system based at least in part on the gathered configuration information.

37 Claims, 3 Drawing Sheets

OTHER PUBLICATIONS

Notification of Transmittal of the International Search Report and the Written Opinion of the International Searching Authority, or the Declaration—Form PCT/ISA/220 (3 pages); PCT International Search Report—Form PCT/ISA/210 (4 pages), and Written Opinion of the International Searching Authority—Form PCT/ISA/237 (5 pages), PCT/US2004/022044, mailed Dec. 2, 2004.

"Installing Documentum Portlets on Windows NT," *Documentum, Inc.*, Version 4.5, Mar. 2002, 28 pages.

"Integrating Documentum Portlets Into Portlets," *Documentum, Inc.*, Version: Draft 0.4, Mar. 2002, 52 pages.

"Using Documentum Portlets," *Documentum, Inc.*, Version 4.5, Jun. 2002, 135 pages.

"Documentum Portal Integration Pack™ Release Notes," *Documentum, Inc.*, Version 4.5a, Aug. 2002, 21 pages.

* cited by examiner

SYSTEM AND METHOD FOR CONFIGURING SERVLET-BASED COMPONENTS AS DYNAMIC CONTENT COMPONENTS

RELATED APPLICATION

This application claims the priority under 35 U.S.C. §119 of provisional application Ser. No. 60/486,588 filed Jul. 11, 2003.

TECHNICAL FIELD

This disclosure relates generally to the field of web communication and more specifically to configuring servlet-based components as dynamic content components.

BACKGROUND

A portal environment may provide a user access to one or more services associated with one or more portlets. The portal environment may be implemented using a different application server system than the portlets. For example, the portlets may provide enterprise content management services or other applications through the portal environment. The portal server system may include a dynamic component which may be implemented as a Java class. Furthermore, the portlets may be servlet based. As an example, the portlet server system may provide a component servlet-based library that contains a suite of portlets.

SUMMARY

The present disclosure provides a system and method for configuring servlet-based components as dynamic content components. In certain embodiments, a system for configuring a servlet-based component as a dynamic content component includes a first server system comprising a dynamic component operable to gather configuration information in response to a request to access a servlet-based component associated with a second server system. The system further includes a connection servlet invoked by the dynamic component and operable to establish a connection with the servlet-based component associated with the second server system based at least in part on the gathered configuration information, and to handle communication with the servlet-based component on the second server system based at least in part on the gathered configuration information.

BRIEF DESCRIPTION OF THE DRAWINGS

For a more complete understanding of the present disclosure and its advantages, reference is now made to the following descriptions, taken in conjunction with the accompanying drawings, in which.

DESCRIPTION OF EXAMPLE EMBODIMENTS

Figure 1:
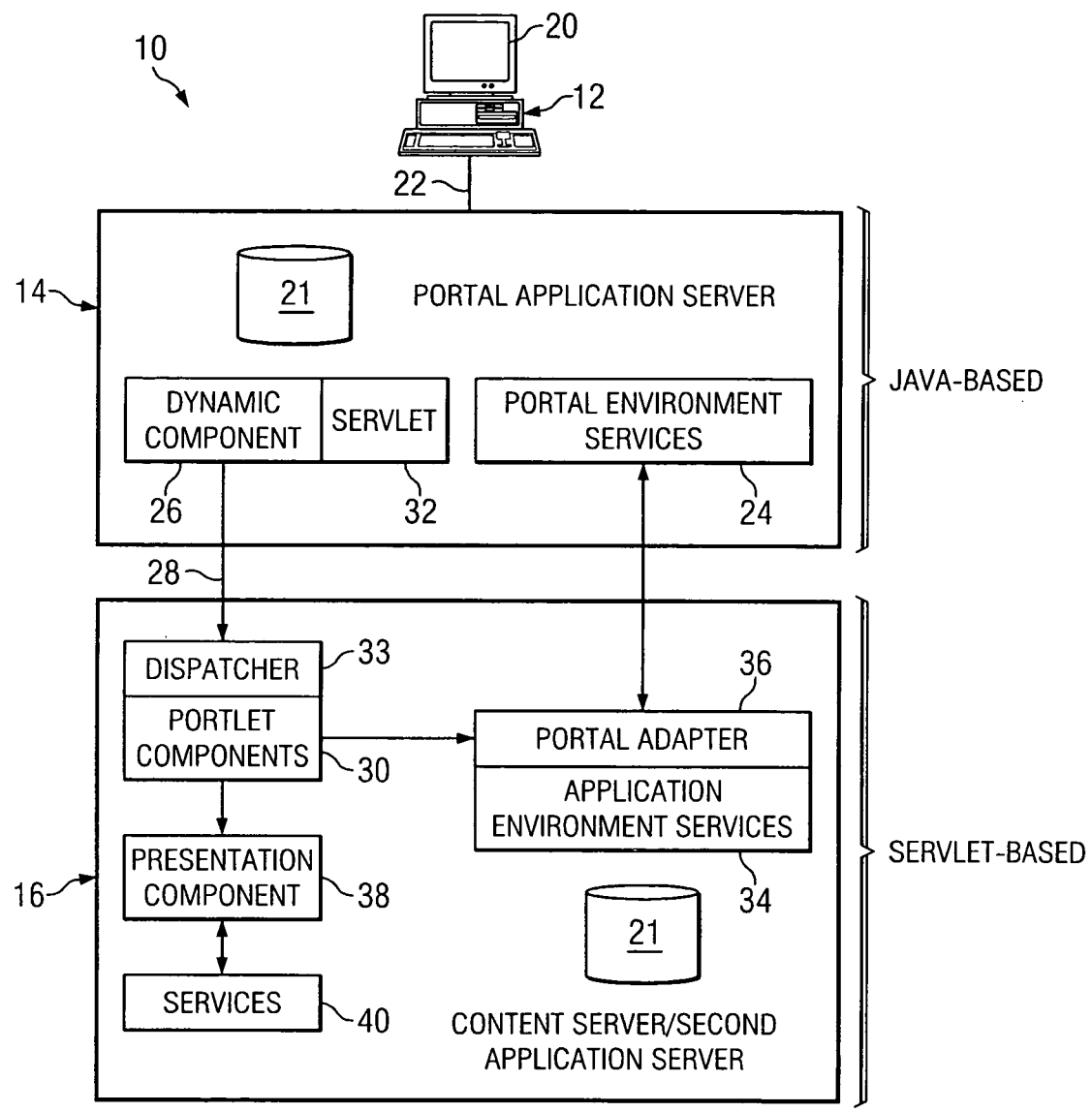
FIG. 1 illustrates an architecture of an example system for invoking and configuring a servlet-based component as a dynamic content component.

FIG. 1 illustrates an example system 10 for configuring a servlet-based component as a dynamic content component. In certain embodiments, system 10 includes one or more user systems 12, a first server system 14, and a second server system 16. Although a particular embodiment of system 10 is illustrated, this is merely for example purposes and system 10 may include any suitable computing environment. In general, a dynamic component on first server system 14 invokes a connection servlet that is operable to establish a connection with a servlet-based component on second server system 16 and to handle communication with the servlet-based component on second server system 16. For example, system 10 may help integrate and deliver one or more dynamic content portlets or Java Server Pages (JSPs) associated with second server system 16 into a portal environment associated with first server system 14. In certain embodiments, a dynamic content component includes a component that may be dynamically configured, based on user-specified configurations, environmental settings, or other suitable configuration parameters for example. Although a connection servlet is described, the dynamic component on first server system 14 may use any suitable method for implementing web or other network communication with a servlet-based component on second server system 16.

Each user system 12 is operable to submit one or more requests to first server system 14 for one or more portal pages for display on user system 12 using a browser 20. A portal may provide access to one or more services, such as enterprise content management services, which may be provided through one or more servlet-based components such as portlets, JSPs, or other applications associated with second server system 16. Each user system 12 may include input devices, output devices, mass storage media, processors, memory, interfaces, communication ports, or other appropriate components for communicating requests to first server system 14 and viewing the portal pages. Additionally, user system 12 may include a personal computer, workstation, network computer, kiosk, wireless data port, personal data assistant (PDA), one or more processors within these or other devices, or any other suitable processing device. Furthermore, although one user system 12 is illustrated, the present disclosure contemplates system 10 including any suitable number of user systems 12, according to particular needs.

Moreover, "user system 12" and "user of user system 12" may be used interchangeably without departing from the scope of this disclosure. As an example, user system 12 may comprise a computer that includes an input device, such as a keypad, touch screen, mouse, or other device that can accept information, and an output device that conveys information associated with the operation of first server system 14 or user systems 12, including digital data, visual information, or any other suitable information. Both the input device and output device may include fixed or removable storage media such as a magnetic computer disk, CD-ROM, or other suitable media to both receive input from and provide output to users of user systems 12 through browsers 20 of user systems 12.

Browser 20 may include a generic web browser that processes information in system 10 and efficiently presents the information to the user of user system 12. First server system 14 may accept data from user system 12 via the web browser 20 (e.g., Microsoft Internet Explorer, Netscape Navigator, or any other suitable web browser) and return the appropriate hypertext markup language (HTML), extensible Markup Language (XML), or other suitable responses.

User system 12 may be coupled to first server system 14 using link 22. Link 22 may facilitate wireless or wireline communication between user system 12 and first server system 14. Link 22 may communicate, for example, Internet Protocol (IP) packets, Frame Relay frames, Asynchronous Transfer Mode (ATM) cells, voice, video, data, and other suitable information between network addresses. Link 22 may include one or more local area networks (LANs), radio access networks (RANs), metropolitan area networks (MANs), wide area networks (WANs), all or a portion of the global computer network known as the Internet, and/or any other communication system or systems at one or more locations.

First server system 14 and second server system 16 may each include one or more electronic computing devices operable to receive, transmit, process and store data associated with system 10. For example, first server system 14 and second server system 16 may each include one or more general-purpose personal computers (PCs), Macintoshes, workstations, Unix-based computers, server computers, or any other suitable devices. In certain embodiments, first server system 14 and second server system 16 each includes a web server. In certain embodiments, first server system 14 and second server system 16 comprise a single server system. In short, server system 14 may include software and/or hardware in any combination suitable for interacting with user system 12. Although a particular number of first server system 14 and second server system 16 are illustrated and described, the present disclosure contemplates system 10 including any suitable number of first server system 14 and second server system 16.

Each of first server system 14 and second server system 16 may include a memory 21. Although memory 21 is illustrated as being included in first server system 14 and second server system 16, the present disclosure contemplates memory 21 being local or remote to first server system 14 and second server system 16. Each memory 21 may include any suitable any fixed or removable storage media such as a local hard disk, a magnetic computer disk, CD-ROM, mass storage media, or other suitable media for storage of data. In certain embodiments, memory 21 includes or is coupled to a database or other suitable information server. Although only one memory 21 is shown in each of first server system 14 and second server system 16, system 10 may include any suitable number and types of memories 21, according to particular needs. Memories 21 may include any hardware, software, firmware, or combination thereof operable to store and facilitate retrieval of information. Additionally, memory 16 may use any of a variety of data structures, arrangements, and compilations to store and facilitate retrieval of information.

FIG. 1 merely provides one example of computers that may be used with the disclosure. For example, although FIG. 1 provides one example of first server system 14 and second server system 16 that may be used with the disclosure, system 10 may be implemented using computers other than servers, as well as a server pool. The present disclosure contemplates computers other than general purpose computers as well as computers without conventional operating systems. As used in this document, the term "computer" is intended to encompass a personal computer, workstation, network computer, or any other suitable processing device.

First server system 14 may include a web application server or any other suitable type of application server. In certain embodiments, first server system 14 includes a portal application server system, which may provide a portal environment to user system 12. For example, a portal may include an access point to one or more services or data, such as enterprise content management services, applications (e.g., client-server applications), files, or any other suitable services or data. In certain embodiments, the portal may provide user system 12 access to one or more servlet-based components such as portlets, JSPs, or other applications associated with second server system 16. First server system 14 may include one or more portal environment services 24, which may provide user system 12 one or more services associated with a portal environment of first server system 14.

First server system 14 may include a dynamic component 26, which may be a Java class, portal dynamic content component. Although described as a dynamic component, the present disclosure contemplates dynamic component 26 including any suitable Java-based component, such as a Java class. In certain embodiments, a dynamic component 26 corresponds to a single servlet-based component on second server system 16, although the present disclosure contemplates a dynamic component 26 corresponding to any suitable number of servlet-based components on second server system 16. In general, dynamic component 26 gathers configuration information such as dynamic and configurable data, from user system 12 or second server system 16 for example. As an example, dynamic component 26 may gather user preference information, user configuration information, user credential information (e.g., user login information), or any other suitable information from user system 12. User preference information may include preferences for displaying the one or more corresponding servlet-based components such as portlets associated with second server system 16. These display preferences may include page size, display format, grid width, grid height, modified-within days, initial mode, folder path, or any other suitable information according to particular needs. In certain embodiments, dynamic component 26 gathers user preference information for each portlet (i.e. portlet component 30) associated with second server system 16 that a user is attempting to access (i.e. through the portal). Dynamic component 26 may store the gathered user preference information, in memory 21 for example.

As another example, dynamic component 26 may gather configuration information that includes one or more configuration settings from second server system 16. For example, the configuration settings of second server system 16 may include the name of second server system 16 (e.g., IP address, machine name, or any other suitable name), port number of second server system 16, web application/directory of a portlet associated with second server system 16, database name (e.g., indicating the database or back-end server to which second server system 16 is connecting to retrieve content for display), or any other suitable information according to particular needs. Dynamic component 26 may gather this information in any suitable manner according to particular needs. In certain embodiments, dynamic component 26 stores the gathered information (e.g., the configuration settings) in memory 21 on first server system 14, although the present disclosure contemplates dynamic component 26 storing the gathered information at any suitable location according to particular needs.

To gather the configuration information, from user system 12 for example, dynamic component 26 may present user system 12 with a suitable document for gathering such information from a user of user system 12 or automatically. The document may be displayable on browser 20 and may include a web form such as an HTML file running on first server system 14, a JSP running on second server system 16, or any other suitable document or file according to particular needs. In short, the present disclosure contemplates gathering the configuration information in any suitable manner according to particular needs.

Dynamic component 26 may initiate establishment of a connection 28 with second server system 16, to provide user system 12 access to one or more servlet-based components associated with second server system 16 for example. In certain embodiments, connection 28 includes a hypertext transfer protocol (HTTP) connection, although the present disclosure contemplates connection 28 including any suitable type of connection according to particular needs. For example, connection 28 may facilitate wireless or wireline communication between first server system 14 and second server system 16. Connection 28 may communicate, for example, Internet Protocol (IP) packets, Frame Relay frames, Asynchronous Transfer Mode (ATM) cells, voice, video, data, and other suitable information between network addresses. Connection 28 may include one or more local area networks (LANs), radio access networks (RANs), metropolitan area networks (MANs), wide area networks (WANs), all or a portion of the global computer network known as the Internet, and/or any other communication system or systems at one or more locations.

In certain embodiments, dynamic component 26 may establish connection 28 to invoke a portlet component 30 on second server system 16. In certain embodiments, a dynamic component 26 is implemented for each portlet component 30 and includes a uniform resource locator (URL) of its corresponding portlet component 30. Dynamic component 26 may pass the gathered configuration information, such as the user configuration information, to the corresponding portlet component 30 associated with second server system 16. Portlet components 30 are discussed in more detail below with reference to second server system 16.

In certain embodiments, dynamic component 26 invokes a connection servlet 32. For example, dynamic component 26 may invoke connection servlet 32 to handle creation of connection 28 and communication with second server system 16. Connection 28 may use one or more request headers and parameters for passing user preference information to second server system 16. Furthermore, connection servlet 32 may establish connection 28 based at least in part on the configuration information gathered by dynamic component 26, such as configuration information of second server system 16.

A response view page received from second server system 16 for the servlet-based component such as portlet component 30 may be modified by connection servlet 32 in certain embodiments. For example, the response view page without modification may include one or more relative links to other servlets, Java Script files, or other suitable links associated with second server system 16. It may be desirable to modify these relative links in the response view page received from second server system 16 in order to convert the relative reference links in the response view page to server URL links. Connection servlet 32 may create connection 28 with one or more proxy settings and may modify one or more relative links in the response code sent from portlet components 30 on second server system 16 as a view page for the portal environment of first server system 14.

In one example embodiment, connection servlet 32 may implement one or more functions, such as a runtime cookie hash table function, a proxy connection function, a modify response code function, a propagating cookies function, or any other suitable functions. In embodiments in which connection servlet 32 implements one or more runtime cookie hash tables, the hash tables may help synchronize portlets of second server system 16 that have the same user login credential information or other configuration information. The hash table may include user login information as user cookies. For example, after connection 28 is established, the user cookies may be cached in the hash table that is used for any subsequent connection 28 to other portlets on second server system 16.

In certain embodiments, connection servlet 32 implements one or more proxy connections. Connection 28 for a portlet component 30 or other servlet-based components may be established with proxy settings and request settings. The request settings may include the original servlet request headers and parameters set by dynamic component 26 to pass user preferences or other configuration information to second server system 16. Connection 28 may in a particular embodiment support two connection methods, a GET connection method and a POST connection method. The GET connection method may be set for the first view page for the portlet component 30 or other servlet-based component and the POST connection method may be set for the view pages requested by selecting any links in the first view page.

In certain embodiments, connection servlet 32 modifies response code received from second server system 16. As described above, the response code sent from second server system 16 may include reference links to one or more portlet resource files or JavaScript files associated with second server system 16. The links may be relative and may not be accessible from first server system 14. A modification may be used to convert all relative links to server URL links. In certain embodiments, if no modification is performed, clicking on any links on the first view page (e.g., using browser 20) may not bring up any further pages, but connection errors.

In certain embodiments, connection servlet 32 propagates one or more cookies. In the first connection response from second server system 16, a new JSP session ID may be created and attached as a response header, set-cookie. The JSP session ID may be important for the portlet. For example, in the first view page, one or more portlet resource and JavaScript files may be loaded by browser 20 when the servlet of the portlet responds. For further access to the portlet and for loading portlet source files, the JSP session ID may be used and may be attached as the servlet response header for the browser 20.

In certain embodiments, using connection servlet 32 to establish connection 28 and to handle communication with second server system 16 may allow portlet components 30 on second server system 16 to be dynamically configurable through the portal environment associated with first server system 14. For example, use of connection servlet 32 may allow portlet components 30 to be plugged-in and integrated into the portal environment associated with first server system 14. In an embodiment in which dynamic component 26 includes a Java class, for example, it may be desirable for dynamic component 26 to use connection servlet 32 to communicate with a servlet-based component on second server system 16, such as a portlet component 30, JSP, or any other suitable component for example.

Second server system 16 may include an application server, a web application server, or any other suitable type of server according to particular needs. In certain embodiments, second server system 16 includes a portlet application server system. Second server system 16 may include one or more portlet components 30. A portlet component 30 may include or may be associated with a web application, a servlet, one or more Java Server Pages (JSPs), or any other suitable component according to particular needs. In certain embodiments, portlet component 30 is servlet-based. A servlet may include a program running on a web server (e.g., first server system 14 or second server system 16), acting as a middle layer between a request coming from a web browser (e.g., browser 20) or other HTTP client and database or applications on the HTTP server. A portlet component 30 may provide access to one or more components, services, or other suitable information associated with second server system 16.

A portlet dispatcher 33 may provide one or more URLs to provide access to one or more portlet components 30 associated with second server system 16 from within a portal environment associated with first server system 14. For example, each portlet component 30 may be associated with a URL. The URL may be the directory of the portlet component 30. Each portlet component 30 may expose a different area of functionality with an associated user interface. Portlet dispatcher 33 may also issue appropriate initialization of the one or more portlet components 30, a portal adapter 36 (described below), or suitable information associated with second server system 16. Although portlet dispatcher 33 is described for providing URL accessibility to portlet components 30, the present disclosure contemplates URL accessibility to portlet components 30 being provided in any suitable manner. Portlet component 30 may use one or more of portal environment services 34, which may include enterprise content management services, applications (e.g., client-server applications), files, or any other suitable services or data. In certain embodiments, portal environment services 34 are provided by one or more third-party software vendors. Although a single portlet component 30 is illustrated, the present disclosure contemplates second server system 16 including any suitable number of portlet components 30 according to particular needs.

Portlet components 30 may be provided to the portal environment associated with first server system 14. In certain embodiments, one or more portlet components 30 are provided by one or more third-party software vendors. In certain embodiments, second server system 14 provides one or more services, such as enterprise content management services, applications (e.g., client-server applications), files, or any other suitable services or data, as discussed above with reference to portal environment services 34. As an example, second server system 16 may provide enterprise content management services to user system 12. These services may be presented through the one or more portlet components 30. The functionality associated with the one or more portlet components 30 may be presented to user system 12 through the portal environment associated with first server system 14. Example portlet components 30 may include Cabinet, Inbox, MyDocuments, MySubscriptions, MyWorkfows, MyFolder, MyWorkarea, and Search. These portlet components 30 are provided merely as examples and are not meant in any limiting sense. The present disclosure contemplates any suitable portlet components 30 according to particular needs. Each portlet component 30 may be associated with its own user preferences. A user preference module may be designed as a web form or JSP and launched from the dynamic component 26 associated with the portlet component 30 for the user to enter user credential and preference information for each portlet component 30.

Second server system 16 may include a portal adapter 36. In certain embodiments, second server system 16 includes a single portal adapter 36 for each portal environment, such as the portal environment associated with first server system 14. Portal adapter 36 may include a system-level software driver that provides connectivity between portlet components 30 or other components associated with second server system 16 and the corresponding portal environment associated with first server system 14.

Second server system 16 may include one or more presentation components 38, which may include one or more controls, web forms, or other suitable components for presenting information. Second server system 16 may also provide one or more services 40, which may provide any suitable functionality, according to particular needs. In certain embodiments, presentation components 38 and/or services 40 are provided by one or more third-party software vendors. In certain embodiments, second server system 16 may be coupled to one or more backend servers, which second server system 16 may access to provide content and/or functionality associated with portlet components 30.

In operation of an example embodiment of system 10, a user of user system 12 may submit a request to first server system 14 for a portal page for display on user system 12, using browser 20 for example. For example, the user of user system 12 may select a portal environment to expose functionality to one or more portlets associated with second server system 16. In certain embodiments, the portal environment may provide a user access to one or more portlets that provide enterprise content management services. In one embodiment, a user of user system 12 requests access to a particular servlet-based component (e.g., a portlet component 30) associated with second server system 16.

Dynamic component 26 of first server system 14 may gather configuration information, such as user preference information, user configuration information, or any other suitable information associated with the user for the particular servlet-based component. User preference information may include preferences for displaying the one or more servlet-based components such as portlet components 30 associated with second server system 16. These display preferences may include page size, display format, grid width, grid height, modified-within days, initial mode, folder path, or any other suitable information according to particular needs. In certain embodiments, dynamic component 26 gathers user preference information for each portlet (i.e. portlet component 30) associated with second server system 16 that a user is attempting to access (i.e. through the portal).

Dynamic component 26 of first server system 14 may gather configuration information about second server system 16. For example, the configuration settings of second server system 16 may include the name of second server system 16 (e.g., IP address, machine name, or any other suitable name), port number of second server system 16, web application/directory of a portlet associated with second server system 16, database name (e.g., indicating the database or back-end server to which second server system 16 is connecting to retrieve content for display), or any other suitable information according to particular needs. Dynamic component 26 may gather this information in any suitable manner according to particular needs. In certain embodiments, dynamic component 26 stores the gathered information (e.g., the configuration settings) in memory 21 on first server system 14, although the present disclosure contemplates dynamic component 26 storing the gathered information at any suitable location according to particular needs.

Dynamic component 26 may invoke connection servlet 32, which may establish connection 28 with a servlet-based component on second server system 16. For example, dynamic component 26 may invoke connection servlet 32 to establish connection 28 with a portlet component 30 on second server system 16. In certain embodiments, connection servlet 32 establishes connection 28 with one or more proxy settings. The request for connection 28 with a servlet-based component may include a URL of the requested servlet-based component. In certain embodiments, connection 28 includes an HTTP connection. The servlet-based component may include a portlet component 30, a JSP of a portlet component 30, or any other suitable component according to particular needs. Connection servlet 32 may communicate the user preference information to the servlet-based component running on second server system 16. While the previous two steps are described as separate steps, the present disclosure contemplates connection servlet 32 establishing connection 28 and communicating the user preference information as a single step, according to particular needs. For example, connection servlet 32 may call a GET connection method, described above.

The servlet-based component such as portlet component 30 may communicate response code to first server system 14 as a view page for the portal environment. In certain embodiments, the response code includes a JSP, a JSP session ID, or any other suitable information. The response code may include one or more relative links to one or more portlet resource files, one or more JavaScript files, or to any other suitable data according to particular needs. In certain embodiments, these relative links are not accessible from first server system 14 or browser 20 in their current state. Connection servlet 32 may modify the one or more relative links before presenting the view page to browser 20 for display. For example, connection servlet 32 may modify the relative links to absolute server URL links for second server system 16 using the gathered system information of second server system 16. In certain embodiments, connection servlet 32 may propagate connection headers and parameters between the servlet-based component and connection 28.

Figure 2:
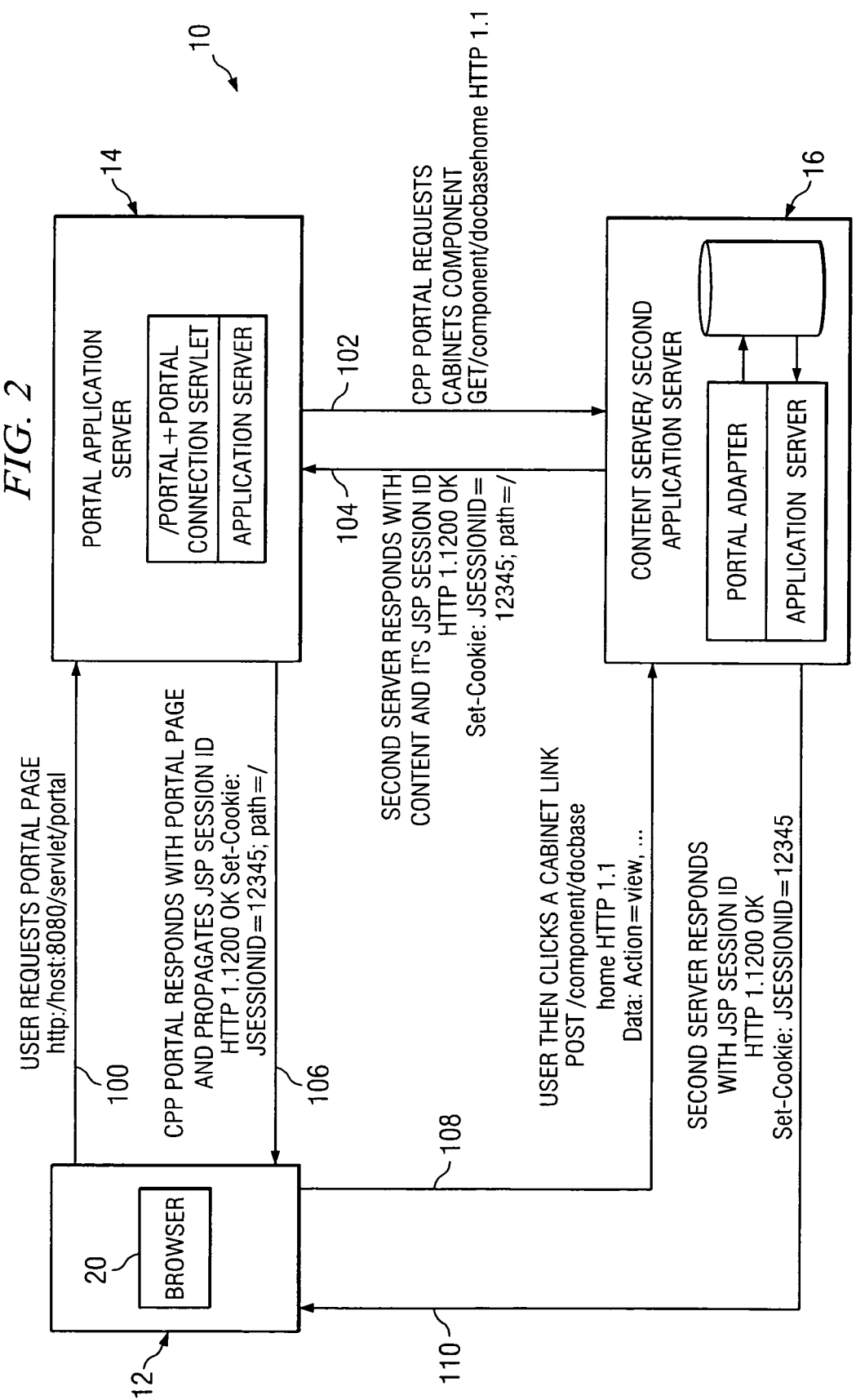
FIG. 2 illustrates an example process for invoking and configuring a servlet-based portlet component as a dynamic content component.

FIG. 2 illustrates an example process for invoking and configuring a servlet-based portlet component 30 as a dynamic content component. The example process described with reference to FIG. 2 is provided merely as an example and is not meant in a limiting sense. At step 100, a user of browser 20 on user system 12 requests a portal page from first server system 14. At step 102, the portal associated with first server system 14 may request a portlet from second server system 16. For example, the dynamic component 26 of first server system 14 may invoke connection servlet 32 to request the Cabinets portlet component 30 from second server system 16. Connection servlet 32 may use the GET connection method described above with reference to FIG. 1 to request the Cabinets portlet component 30.

At step 104, second server system 16 may respond by communicating content of the Cabinets portlet component 30 to first server system 14. In certain embodiments, the content of Cabinets portlet component 30 includes a JSP. In this embodiment, second server system 16 may also respond by communicating a JSP session ID associated with the Cabinets portlet component 30 to first server system 14. For example, the JSP session ID may be attached as a response header, such as set-cookie. At step 106, first server system 14 may communicate a portal page to browser 20, the response including a JSP session ID. For example, the first server system may render the portal page as a complete HTML page based on user preference information or any other suitable information. This JSP session ID may be different from the JSP session ID communicated by second server system 16 at step 104.

At step 108, the user of browser 20 on user system 12 may click on or otherwise select the Cabinet link of the portal page for example. For example, selecting the Cabinet link may invoke the POST connection method described above with reference to FIG. 1. In certain embodiments, no JSP session ID is transmitted to second server system 16 when the user selects the Cabinet link. At step 110, second server system 16 may respond to the user selection of the Cabinet link with a session ID.

Figure 3:
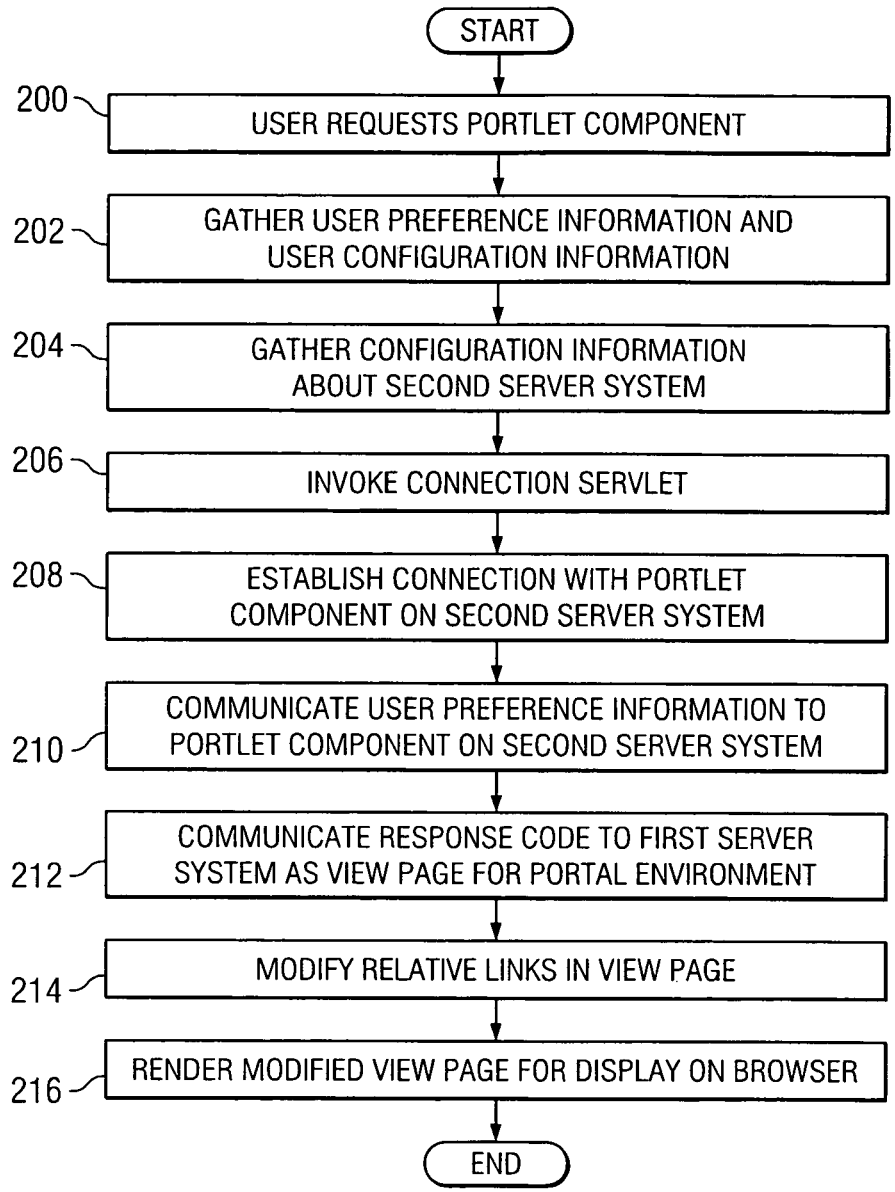
FIG. 3 illustrates an example method for invoking and configuring a servlet-based component as a dynamic content component.

FIG. 3 illustrates an example method for invoking and configuring a servlet-based component as a dynamic content component. For purposes of the example method described with reference to FIG. 3, the servlet-based component will be described as portlet component 30; however, the present disclosure contemplates configuring any suitable type of servlet-based component as a dynamic content component. At step 200, a user of user system 12 may submit a request to first server system 14 for a portlet component 30 for display on user system 12, using a browser 20 for example. For example, the user of user system 12 may select a portal environment to expose functionality to a portlet component 30 associated with a second server system 16. In certain embodiments, the portal environment may provide a user access to one or more portlets that provide enterprise content management services. Although a single portlet component 30 is described with reference to FIG. 3, the present disclosure contemplates the user requesting access to one or more portlet components 30.

At step 202, a dynamic component 26 of first server system 14 may gather configuration information, from user system 12 for example. In certain embodiments, the configuration information includes user preference information, user configuration information, user credential information, or any other suitable information associated with the user. At step 204, dynamic component 26 of first server system 14 may gather configuration information about second server system 16. In certain embodiments, to gather the configuration information described with reference to steps 202 and 204, from user system 12 for example, dynamic component 26 may present user system 12 with a suitable document for gathering such information from a user of user system 12 or automatically. The document may be displayable on browser 20 and may include a web form such as an HTML file running on first server system 14, a JSP running on second server system 16, or any other suitable document or file according to particular needs. Although steps 202 and 204 are described as separate steps, the present disclosure contemplates gathering the configuration information in a single step if appropriate. Furthermore, the present disclosure contemplates dynamic component 26 gathering the configuration information in any suitable manner according to particular needs.

At step 206, dynamic component 26 may invoke connection servlet 32 to establish a connection 28 with portlet component 30 on server system 16. At step 208, connection servlet 32 may establish connection 28 with portlet component 30 on second server system 16. For example, connection servlet 32 may establish connection 28 with one or more proxy settings. In certain embodiments, connection servlet 32 establishes connection 28 with portlet component 30 based at least in part on the all or a portion of the configuration information gathered by dynamic component 26. The request for connection 28 with portlet component 30 may include a URL of the requested portlet component 30. In certain embodiments, connection 28 includes an HTTP connection. Furthermore, although a portlet component 30 is primarily described, the present disclosure contemplates connection servlet 32 establishing a connection with a JSP of a portlet component 30 or any other suitable servlet-based component according to particular needs. At step 210, connection servlet 32 may communicate the user preference information gathered by dynamic component 26 to portlet component 30 associated with second server system 16. Although steps 208 and 210 are described as separate steps, the present disclosure contemplates steps 208 and 210 being performed as a single step, according to particular needs. For example, connection servlet 32 may call a GET connection method as described above with reference to FIG. 1.

At step 212, the portlet component 30 may communicate response code to first server system 14 as a view page for the portal environment. In certain embodiments, the response code includes a JSP and a JSP session ID. The response code may include one or more relative links to one or more portlet resource files, one or more JavaScript files, or to any other suitable data according to particular needs. In certain embodiments, these relative links are not accessible from first server system 14 or browser 20 in their current state. At step 214, connection servlet 32 may modify the one or more relative links before presenting the view page to browser 20 for display. For example, connection servlet 32 may modify the relative links to absolute server URL links for second server system 16 using the gathered system information of second server system 16. In certain embodiments, connection servlet 32 may propagate connection headers and parameters between the portlet component 30 and connection 28. At step 216, dynamic component 26 or another suitable component of server system 14 or user system 12 may render the modified view page for display on browser 20.

Although a particular method for configuring a servlet-based component as a dynamically configurable component has been described with reference to FIG. 3, the present disclosure contemplates any suitable method for configuring a servlet-based component as a dynamically configurable component in accordance with the present disclosure. Thus, certain of the steps described with reference to FIG. 3 may take place simultaneously and/or in different orders than as shown. Moreover, components of system 10 may use methods with additional steps, fewer steps, and/or different steps, so long as the methods remain appropriate.

Furthermore, while certain steps describe an example embodiment in which connection servlet 32 is used to communicate between dynamic component 26 of first server system 14 and second server system 16, the present disclosure contemplates dynamic component 26 of first server system 14 and second server system 16 communicating in any suitable manner according to particular needs.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system for configuring a servlet-based component as a dynamic content component, comprising:
a processor of a first server system, configured to:
provide a dynamic component configured to:
gather, at the first server system, user configuration information in response to a request to access a servlet-based component of a second server system different than the first server system, wherein the user configuration information comprises a user display preference that controls a display format of response content communicated from the servlet-based component,
gather, at the first server system, server configuration information from the second server system, wherein the server configuration information comprises a server setting for the servlet-based component,
receive, at the first server system, the response content communicated from the servlet-based component that is formatted according to the user display preference as formatted response content, wherein the response content is communicated from the servlet-based component as a viewable page for a portal environment of the first server system, and wherein the response content is received using at least the server setting and comprises a first session identifier characteristic of the response content,
modify the response content based on the server configuration information to form modified response content comprising a second session identifier characteristic thereof, the second session identifier characteristic different from the first session identifier characteristic,
render a portal page including the modified response content based on the user display preference, and
provide a connection servlet configured to:
facilitate, at the first server system, communication between the dynamic component and the servlet-based component by establishing and managing a connection with the servlet-based component using the server setting and by communicating the user configuration information including said user display preference to the servlet-based component of the second server system to configure the display format of the response content from the servlet-based component such that the formatted response content received from the servlet-based component is able to be displayed in the portal environment of the first server system.

2. The system of claim 1, wherein the connection servlet is further configured to:
establish a second connection to a second servlet-based component on the second server system using the server configuration information; and
communicate second user configuration information comprising a second user display preference to the second servlet-based component, wherein the user display preference differs from the second user display preference of the second user configuration information such that the response content is formatted differently than second response content communicated from the second servlet-based component.

3. The system of claim 2, wherein the first user configuration information and the second user configuration information share user login information, and wherein the connection servlet is further configured to:
cache a cookie hash table to store the shared login information; and
use the cached cookie hash table when subsequently connecting to the servlet-based component or the second servlet-based component.

4. The system of claim 2, wherein the connection servlet is further configured to:
receive a first Java Server Page (JSP) session identifier as the first session identifier from the second server; and
distinguish the first connection from the second connection using the first JSP session identifier.

5. The system of claim 1, wherein the dynamic component comprises a Java class.

6. The system of claim 1, wherein the first server system comprises a portal server system configured to provide services to a user system coupled to the first server system.

7. The system of claim 6, wherein the second server system is an enterprise content management server, and wherein the servlet-based component is a component that exposes at least a portion of the content managed by the enterprise content management server, thereby enabling publication of the at least a portion of the content through the portal server system.

8. The system of claim 1, wherein the connection servlet is further configured to create the connection with a proxy setting.

9. The system of claim 1, wherein a related link in the response content is a relative link modified to be an absolute server uniform resource locator link associated with the second server system, wherein access to the second server system from the first server system is otherwise not possible without the modification.

10. The system of claim 1, wherein the servlet-based component on the second server system comprises: a Java Server Pages (JSP); a servlet-based portlet; or a web application.

11. The system of claim 1, wherein the servlet-based component on the second server system comprises a portlet component that provides an application program interface that exposes configurable functionality in a portal environment associated with the first server system, the user configuration information comprises login information, and the connection servlet on the first server system is configured to:
   communicate the gathered login information to the servlet-based component on the second server system; and
   request services on a back-end server system associated with the second server system.

12. The system of claim 1, wherein the connection servlet is further configured to propagate a header and a parameter between a servlet-based component and the connection.

13. The system of claim 1, wherein the connection comprises a hypertext transfer protocol (HTTP) connection.

14. The system of claim 1, wherein the dynamic component is further configured to:
   store the server configuration information in a memory at a client.

15. The system of claim 1, wherein a link in the response content is modified using the server configuration information.

16. A method for configuring a servlet-based component as a dynamic content component, comprising:
   gathering, by a processor of a dynamic component of a first server system, user configuration information in response to a request to access a servlet-based component of a second server system, wherein the user configuration information comprises a user display preference that controls a display format of response content from the servlet-based component, and wherein the response content is communicated from the servlet-based component as a viewable page for a portal environment of the first server system;
   gathering, by the processor of the dynamic component of the first server system, server configuration information from the second server system, wherein the server configuration information comprises a server setting for the servlet-based component;
   receiving the response content communicated from the servlet-based component that is formatted according to the user display preference as formatted response content, and wherein the response content is received using at least the server setting, and wherein the response content is to be presented at the first server system and comprises a first session identifier characteristic of the response content;
   modifying the response content based on the server configuration information to form modified response content comprising a second session identifier characteristic thereof, the second session identifier characteristic different from the first session identifier characteristic;
   rendering, by the processor of the dynamic component of the first server system, a portal page including the modified response content based on the user display preference; and
   invoking, by the processor of the dynamic component, a connection servlet to facilitate communication between the dynamic component and the servlet-based component by establishing and managing a connection with the servlet-based component using the server setting and by communicating the user configuration information including said user display preference to the servlet-based component such that the formatted response content received from the servlet-based component is able to be displayed in the portal environment of the first server system.

17. The method of claim 16, wherein the method further comprises:
   establishing, by the processor of the dynamic component, a second connection to a second servlet-based component on the second server system using the server configuration information; and
   communicating, by the processor of the dynamic component, second user configuration information comprising a second user display preference to the second servlet-based component, wherein the user display preference differs from the second user display preference of the second user configuration information such that the response content is formatted differently than second response content communicated from the second servlet-based component.

18. The method of claim 16, wherein a dynamic component for gathering the user configuration information and the server configuration information comprises a Java class.

19. The method of claim 16, wherein the first server system comprises a portal server system configured to provide services to a user system coupled to the first server system.

20. The method of claim 16, further comprising, using the connection servlet, creating the connection with a proxy setting.

21. The method of claim 16, wherein a related link in the response content is a relative link modified to be an absolute server uniform resource locator link associated with the second server system, wherein access to the second server system from the first server system is otherwise not possible without the modification.

22. The method of claim 16, wherein the servlet-based component on the second server system comprises:
   a Java Server Pages (JSP);
   a servlet-based portlet; or
   a web application.

23. The method of claim 16, wherein:
   the servlet-based component on the second server system comprises a portlet component that provides an application program interface that exposes configurable functionality in a portal environment associated with the first server system;
   the user configuration information comprises user preference and login information; and the method further comprises:
   using the connection servlet, communicating the user preference and login information to the servlet-based component on the second server system; and
   using the connection servlet, requesting services on a back-end server system associated with the second server system.

24. The method of claim 16, further comprising, using the connection servlet, propagating a header and a parameter between a servlet-based and the connection.

25. The method of claim 16, wherein the connection comprises a hypertext transfer protocol (HTTP) connection.

26. The method of claim 16, wherein a link in the response content is modified using the server configuration information.

27. A non-transitory computer readable medium storing computer executable instructions thereon for configuring a servlet-based component as a dynamic content component, the instructions, when executed on a processor, configuring the processor to:
- gather, at a first server system, user configuration information in response to a request to access a servlet-based component of a second server system, wherein the user configuration information comprises a user display preference that controls a display format of response content communicated from the servlet-based component, and wherein the response content is communicated from the servlet-based component as a viewable page for a portal environment of the first server system;
- gather, at the first server system, server configuration information from the second server system, wherein the server configuration information comprises a server setting for the servlet-based component;
- receive the response content communicated from the servlet-based component that is formatted according to the user display preference as formatted response content, and wherein the response content is received using at least the server setting and comprises a first session identifier characteristic of the response content, and wherein content from the servlet-based component is to be presented at the first server system;
- modify the response content based on the server configuration information to form modified response content comprising a second session identifier characteristic thereof, the second session identifier characteristic different from the first session identifier characteristic;
- render a portal page including the modified response content based on the user display preference; and
- invoke a connection servlet to facilitate communication between the dynamic component and the servlet-based component by establishing and managing a connection with the servlet-based component using the server setting and by communicating the user configuration information including said user display preference to the servlet-based component of the second server system to configure the display format of the response content from the servlet-based component such that the formatted response content received from the servlet-based component is able to be displayed in the portal environment of the first server system.

28. The non-transitory computer readable medium of claim 27, wherein the instructions when executed further configure the processor to:
- establish a second connection to a second servlet-based component on the second server system using the server configuration information; and
- communicate second user configuration information comprising a second user display preference to the second servlet-based component, wherein the user display preference differs from the second user display preference of the second user configuration information such that the response content is formatted differently than second response content communicated from the second servlet-based component.

29. The non-transitory computer readable medium of claim 27, wherein a dynamic component that receives the user configuration information and the server configuration information comprises a Java class.

30. The non-transitory computer readable medium of claim 27, wherein the first server system comprises a portal server system configured to provide services to a user system coupled to the first server system.

31. The non-transitory computer readable medium of claim 27, wherein the instructions when executed further configure the processor to, using the connection servlet, create the connection with a proxy setting.

32. The non-transitory computer readable medium of claim 27, wherein a related link links in the response content is a relative link modified to be an absolute server uniform resource locator link associated with the second server system, wherein access to the second server system from the first server system is otherwise not possible without the modification.

33. The non-transitory computer readable medium of claim 27, wherein the servlet-based component on the second server system comprises:
- a Java Server Pages (JSP);
- a servlet-based portlet; or
- a web application.

34. The non-transitory computer readable medium of claim 27, wherein:
- the servlet-based component on the second server system comprises a portlet component that provides an application program interface that exposes configurable functionality in a portal environment associated with the first server system;
- the configuration information comprising login information; and the connection is configured to, using the connection servlet:
- communicate the login information to the servlet-based component on the second server system; and
- request services on a back-end server system associated with the second server system.

35. The non-transitory computer readable medium of claim 27, further operable to, using the connection servlet, propagate a header and a parameter between a servlet-based component and the connection.

36. The non-transitory computer readable medium of claim 27, wherein the connection comprises a hypertext transfer protocol (HTTP) connection.

37. The non-transitory computer readable medium of claim 27, wherein a link in the response content is modified using the server configuration information.

* * * * *

UNITED STATES PATENT AND TRADEMARK OFFICE
CERTIFICATE OF CORRECTION

PATENT NO. : 8,429,249 B2
APPLICATION NO. : 10/819013
DATED : April 23, 2013
INVENTOR(S) : Sheue Yuan Page 1 of 1

It is certified that error appears in the above-identified patent and that said Letters Patent is hereby corrected as shown below:

In the Claims

Column 14, line 65 (claim 24, line 3) change "servlet-based and" to -- servlet-based component and --

Column 16, line 20 (claim 32, line 2) change "link links" to -- link --

Signed and Sealed this
Fifth Day of November, 2013

Teresa Stanek Rea
*Deputy Director of the United States Patent and Trademark Office*